(12) United States Patent
Cundill et al.

(10) Patent No.: US 8,880,624 B2
(45) Date of Patent: Nov. 4, 2014

(54) METHOD AND APPARATUS FOR RECEIVING DATA FROM A PLURALITY OF FEED SOURCES

(75) Inventors: Andrew Philip Cundill, Ottawa (CA); Heloise Rose Doucet, Ottawa (CA)

(73) Assignee: BlackBerry Limited, Waterloo (CA)

( * ) Notice: Subject to any disclaimer, the term of this patent is extended or adjusted under 35 U.S.C. 154(b) by 479 days.

(21) Appl. No.: 13/090,464

(22) Filed: Apr. 20, 2011

(65) Prior Publication Data

US 2011/0264783 A1 Oct. 27, 2011

Related U.S. Application Data

(60) Provisional application No. 61/327,407, filed on Apr. 23, 2010.

(51) Int. Cl.
  *G06F 15/16* (2006.01)
  *G06F 17/30* (2006.01)
  *H04L 29/08* (2006.01)

(52) U.S. Cl.
  CPC .......... *H04L 67/26* (2013.01); *G06F 17/30867* (2013.01); *H04L 67/02* (2013.01)
  USPC ....................................... 709/206

(58) Field of Classification Search
  USPC ............... 706/223, 219; 709/206, 223, 219
  See application file for complete search history.

(56) References Cited

U.S. PATENT DOCUMENTS

| 7,197,531 | B2 | 3/2007 | Anderson |
| 7,673,327 | B1 | 3/2010 | Polis et al. |
| 7,751,807 | B2 | 7/2010 | Lin et al. |
| 2002/0094806 | A1 | 7/2002 | Kamimura |
| 2004/0172415 | A1 | 9/2004 | Messina et al. |
| 2005/0001904 | A1 | 1/2005 | Kiiskinen |
| 2005/0137015 | A1 | 6/2005 | Rogers et al. |
| 2005/0250548 | A1 | 11/2005 | White |
| 2006/0095530 | A1 | 5/2006 | Daniell et al. |
| 2007/0094418 | A1 | 4/2007 | Reisman |
| 2007/0100648 | A1 | 5/2007 | Borquez et al. |
| 2007/0250643 | A1* | 10/2007 | Pyhalammi et al. .......... 709/245 |
| 2007/0300234 | A1* | 12/2007 | Dekel et al. .................. 719/313 |

(Continued)

FOREIGN PATENT DOCUMENTS

| WO | 2008/082794 A2 | 7/2008 |
| WO | 2008100893 A1 | 8/2008 |
| WO | 2009023982 A1 | 2/2009 |
| WO | 2010001182 A2 | 1/2010 |

OTHER PUBLICATIONS

Related European Patent Application No. 11163229.5 Search Report dated Nov. 15, 2011.

(Continued)

*Primary Examiner* — Ario Etienne
*Assistant Examiner* — Uzma Alam
(74) *Attorney, Agent, or Firm* — Perry + Currier Inc.

(57) ABSTRACT

The present specification relates generally to computing devices and more particular relates to a method and apparatus for receiving data from a plurality of feed sources at a plurality of servers via a mobile device comprising a processor interconnected with a display. In one aspect, the mobile device is configured to start a feed service; register feed adapters with the feed service; receive content data via the feed adapters; and generate a list view of the content data on a display of the mobile device.

20 Claims, 13 Drawing Sheets

(56) References Cited

U.S. PATENT DOCUMENTS

| | | | |
|---|---|---|---|
| 2008/0108299 A1 | 5/2008 | Hullot | |
| 2008/0114938 A1* | 5/2008 | Borgendale | 711/118 |
| 2008/0194276 A1 | 8/2008 | Lin et al. | |
| 2008/0195712 A1 | 8/2008 | Lin et al. | |
| 2008/0195962 A1 | 8/2008 | Lin et al. | |
| 2008/0299997 A1 | 12/2008 | Klassen et al. | |
| 2008/0301175 A1 | 12/2008 | Applebaum et al. | |
| 2009/0031232 A1 | 1/2009 | Brezina et al. | |
| 2009/0144639 A1 | 6/2009 | Nims et al. | |
| 2009/0228807 A1 | 9/2009 | Lemay | |
| 2009/0271712 A1 | 10/2009 | Ligh et al. | |
| 2009/0271778 A1* | 10/2009 | Mandyam et al. | 717/171 |
| 2009/0307603 A1* | 12/2009 | Gowda et al. | 715/749 |
| 2010/0011422 A1 | 1/2010 | Mason et al. | |
| 2010/0016003 A1 | 1/2010 | Shapiro et al. | |
| 2010/0070899 A1 | 3/2010 | Hunt et al. | |
| 2010/0106782 A1* | 4/2010 | Huang et al. | 709/206 |
| 2010/0121831 A1* | 5/2010 | Lin et al. | 707/706 |
| 2010/0125584 A1* | 5/2010 | Navas | 707/747 |
| 2010/0138371 A1* | 6/2010 | Ishii | 706/12 |
| 2010/0144328 A1 | 6/2010 | Keating et al. | |
| 2010/0268584 A1 | 10/2010 | Pullur et al. | |
| 2010/0274847 A1 | 10/2010 | Anderson et al. | |
| 2011/0026704 A1 | 2/2011 | Connelly et al. | |
| 2011/0053578 A1 | 3/2011 | Rochford | |
| 2011/0078111 A1 | 3/2011 | Scott et al. | |
| 2011/0087732 A1 | 4/2011 | Lakshmanan et al. | |
| 2011/0125765 A1 | 5/2011 | Tuli | |
| 2011/0173238 A1 | 7/2011 | Griggs | |
| 2011/0197163 A1 | 8/2011 | Jegal et al. | |
| 2011/0227810 A1 | 9/2011 | McKinney et al. | |
| 2011/0238755 A1 | 9/2011 | Khan et al. | |
| 2011/0258016 A1 | 10/2011 | Barak et al. | |
| 2011/0321129 A1 | 12/2011 | Kinsel et al. | |

OTHER PUBLICATIONS

Corresponding European Patent Application No. 11163220.4 Search Report dated Dec. 20, 2011.

HootSuite: "HootSuite iPhone App", YouTube Website, Dec. 3, 2009, XP002659577, Retrieved from the Internet: URL:http://www.youtube.com/watch?v=-YwC3PX8_Ns&feature=player_embedded.

Chris Trottier: "Announcing HootSuite for iPhone", HootSuite Blog, Dec. 9, 2009, XP002659576, Retrieved from the Internet: URL:http://blog.hootsuite.com/announcing-hootsuite-for-iphone/[retrieved on Sep. 21, 2011].

Krista Graham: "TechMatters: Hear the Librarian Go Tweet, Tweet, Tweet: Beyond the Basics (Part II)", LOEX Clearinghouse for Library Instruction, vol. 36, No. 4 Feb. 1, 2010, pp. 6-7, 10, XP002659664.

http://www.softpedia.com/get/Multimedia/Graphic/Graphic-Viewers/Universal-Viewer-Pro.shtml Last Updated Jun. 29, 2009.

Universal Viewer, GooglePreview, and CoolPreviews, downloaded from http://www.findmysoft.com/news/Universal-Viewer-GooglePreview-and-CoolPreviews/; Feb. 17, 2009.

List of portable software—Wikipedia, downloaded from http://en.wikipedia.org/wiki/List_of_portable_software; Nov. 9, 2009.

http://www.youtube.com/watch?v=p8IZmLmwr_A iphone Apps—Facebook 2.0; Nov. 11, 2008.

http://www.youtube.com/watch?v=wFqBNXZ4SHI iphone Sliding Menu (facebook style); Nov. 16, 2008.

http://www.youtube.com/watch?v=8dM4X-KveSs MWC: Microsoft debuts Windows Phone 7 Series; Feb. 15, 2010.

http://www.svpocketpc.com/reviews/listpro4/ListPro4.html Feb. 13, 2004.

http://media.wbpsystems.com/torch_mobile_book.pdf Downloaded from the Internet on Feb. 6, 2011.

http://duncsweb.com/2009/12/07/review-snaptu-twitter-facebook-rss-google-calendar-flickr-tv-movies-picasa-more-on-your-mobile-device/ Dec. 7, 2009.

http://www.realmacsoftware.com/socialite/ 2009.

http://www.macworld.com/appguide/app.html?id=86956 Dec. 5, 2008.

http://www.makeuseof.com/dir/combine-multiple-feeds/ Jun. 8, 2009.

http://mobile.engadget.com/2009/03/23/socialscope-for-blackberry-impressions-and-invites/ Mar. 23, 2009.

http://mashable.com/2008/07/15/twhirl-tweetdeck-comparison/ Jul. 15, 2008.

http://en.wikipedia.org/wiki/Ping.fm Apr. 18, 2011.

http://mashable.com/2009/08/05/twitter-blackberry-clients/ Ubertwitter Aug. 5, 2009.

http://www.ifreeware.net/download-listening-to—share-what-you-are-listening-to-on-facebook-twitter.html Feb. 5, 2011.

Seesmic for iPhone http://blog.seesmic.com/2010/05/introducing-seesmic-for-iphone-1.html May 2010.

http://www.twitip.com/manage-your-messages-on-dozens-of-social-networking-serviced-at-once-with-pingfm/ Feb. 1, 2009.

Atomkeep syncs profile information across multiple services Aug. 5, 2008.

Technotraits.com 7+ Websites That Upload Files to Multiple File sharing Sites At Once Apr. 1, 2009.

Blogsdna.com TubeMogul Lets You to Upload Videos to Multiple Video sharing Websites in One Shot Apr. 20, 2009.

Ubergizmo.com JOGGLE: Manage Your Media Files Across Multiple Devices and Websites Jan. 28, 2008.

Betadaily.com Upload Photos and Videos to Multiple Websites At Once From Computer and Mobile Phone Apr. 26, 2008.

Etiole.com Upload Images to Multiple site at once through PhotoScatter iPhone app Oct. 7, 2009.

Pingfm.pbworks.com Ping.fm Help and Information Wiki : Posting Photos Apr. 24, 2009.

Jegal et al., U.S. Appl. No. 61/303,505, filed on Feb. 11, 2010.

Amit Agarwal. "Publish the Same Blog Post to Multiple Blogging Sites at Once", publicly available on Oct. 14, 2008.

Related U.S. Appl. No. 13/091,812 Office Action dated Mar. 21, 2013.

* cited by examiner

FIG. 12 shows a flow diagram of the methods of FIGS. 9 and 10 being performed by a feed application according to an exemplary embodiment; and FIG. 13 is a block diagram of an adapter according to an exemplary embodiment.

METHOD AND APPARATUS FOR RECEIVING DATA FROM A PLURALITY OF FEED SOURCES

PRIORITY CLAIM

The present specification claims priority from U.S. Provisional Patent Application 61/327,407 filed Apr. 23, 2010, the contents of which are incorporated herein by reference.

FIELD OF INVENTION

The present specification relates generally to computing devices and more particularly relates to a method and apparatus for receiving data from a plurality of feed sources.

BACKGROUND

The evolution of computers is currently quite active in the mobile device environment. It is now well-known to include feed applications and posting applications in mobile devices. Numerous types of feed sources are currently available (e.g., social networking, instant messaging, enterprise application, really simple syndication (RSS), media subscriptions, etc. . . . ). Each type of feed source includes many specific sources (e.g., social networking sources include Facebook™, and Twitter™). A plurality of accounts for each specific feed source can exist. The number of types of feed sources and the number of specific sources continue to increase.

Content may be received from more than one feed source. For example, it is not uncommon for a device to be used to monitor a Facebook™ account, multiple Twitter™ accounts, and multiple RSS news sources.

BRIEF DESCRIPTION OF THE DRAWINGS

For a better understanding of the various implementations described herein and to show more clearly how they may be carried into effect, reference will now be made, by way of example only, to the accompanying drawings which show at least one example implementation and in which.

DETAILED DESCRIPTION

Figure 1:
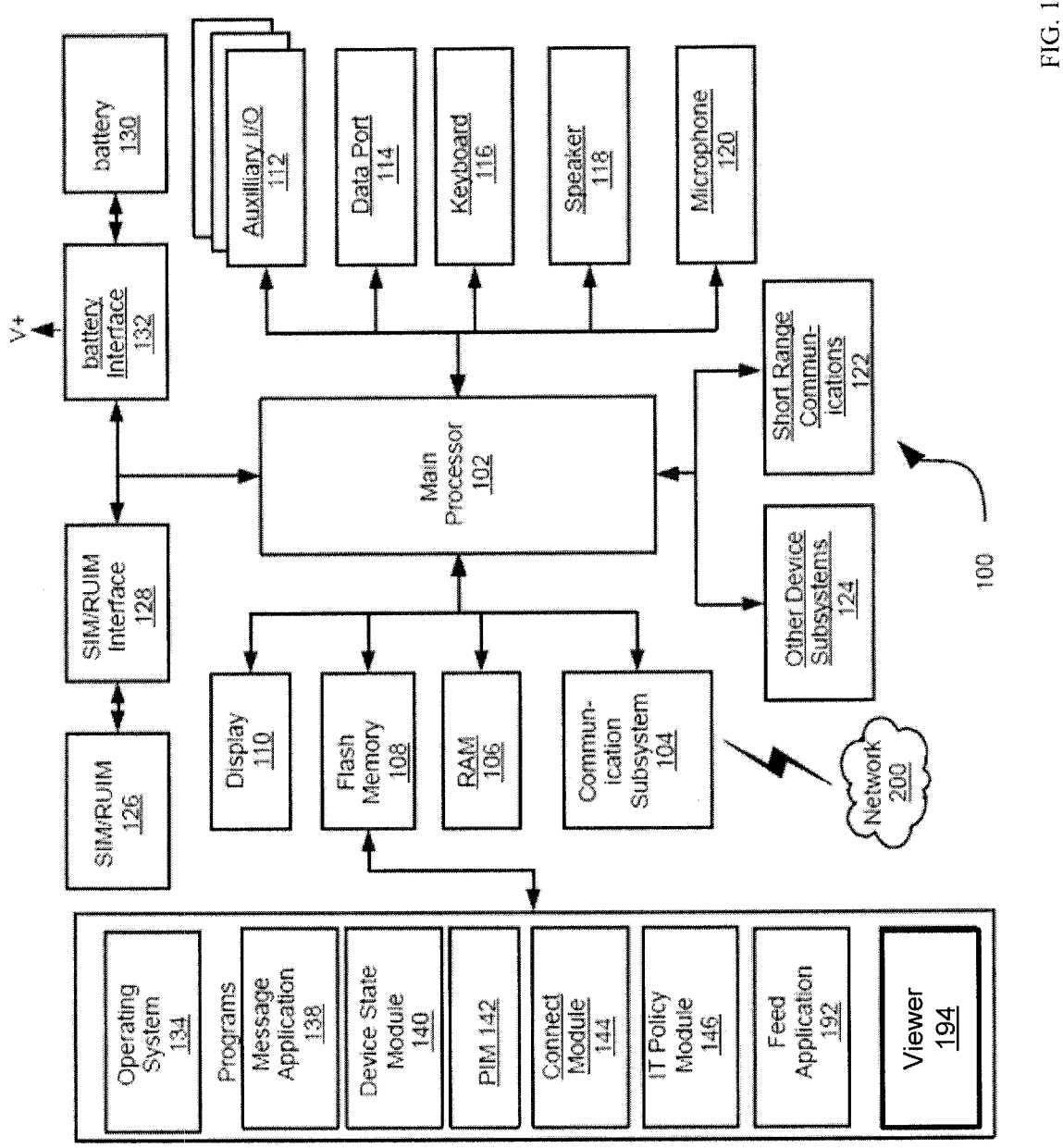
FIG. 1 is a block diagram of an example implementation of a mobile device.

An aspect of this specification provides a method of receiving data from a plurality of feed sources at a plurality of servers via a mobile device, the mobile device having a processor interconnected with a display, the method comprising: starting, via the processor, a feed service; registering, via the processor, feed adapters with the feed service; receiving content data via the feed adapters; and controlling the display to generate a list view of the content data.

The method can further comprise the feed adapters connecting to the servers.

The method can further comprise registering, via the processor, listeners with the feed adapters.

The method can further comprise starting, via the processor, a content listener. The registering listeners can comprise the content listener registering the listeners with the feed adapters.

The receiving content data can comprise receiving pending content.

The receiving content data can comprise receiving new content.

The controlling the display to generate the list view of the content data can comprise displaying the content data via a viewer.

The controlling the display to generate the list view of the content data can comprise starting the viewer.

The controlling the display to generate the list view of the content data can comprise the viewer retrieving the content from the feed service.

The controlling the display to generate the list view of the content data can comprise the viewer connecting to the feed service.

The method can further comprise retrieving accounts for the feed adapters.

The retrieving accounts can comprise retrieving the feed adapters associated with the feed service and requesting all accounts associated with each the feed adapters.

The receiving content data can comprise retrieving a predetermined amount of content from a server.

Another aspect of this specification provides a mobile device for receiving data from a plurality of feed sources at a plurality of servers, the mobile device comprising: a display; and a processor configured to: start a feed service; register feed adapters with the feed service; receive content data via the feed adapters; and control the display to generate a list view of the content data.

The processor can further be configured to connect the feed adapters to the servers.

The processor can further be configured to register listeners with the feed adapters.

The processor can further be configured to start a content listener. The registering the listeners can comprise the content listener registering the listeners with the feed adapters.

The receive content data can comprise receiving pending content.

The receive content data can comprise receiving new content.

Another aspect of this specification provides a computer program product, for a mobile device comprising a processor interconnected with a display, the computer program product comprising a non-transitory computer-readable storage medium having a computer-readable code adapted to be executed on the processor to implement a method of receiving data from a plurality of feed sources at a plurality of servers via the mobile device, the method comprising: starting, via the processor, a feed service; registering, via the processor, feed adapters with the feed service; receiving content data via the feed adapters; and controlling the display to generate a list view of the content data.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The implementations described herein generally relate to a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, a tablet computing device, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of an example implementation of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the implementations described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106 (which can be generally viewed as any type of volatile storage), a flash memory 108 (which can be generally viewed as any type of non-volatile storage), a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. In certain implementations, to identify a subscriber, the mobile device 100 utilizes a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, identification information can also be programmed into the flash memory 108.

The mobile device 100 is a battery-powered device and includes a battery interface 132 for receiving one or more rechargeable batteries 130. In at least some implementations, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows mobile device 100 to send and receive electronic messages. Various alternatives exist for the message application 138 as is well known to those skilled in the art. Messages that have been sent or received are typically stored in the flash memory 108 of the mobile device 100 or some other suitable storage element in the mobile device 100. In at least some implementations, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 108 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some implementations, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

Figure 3:
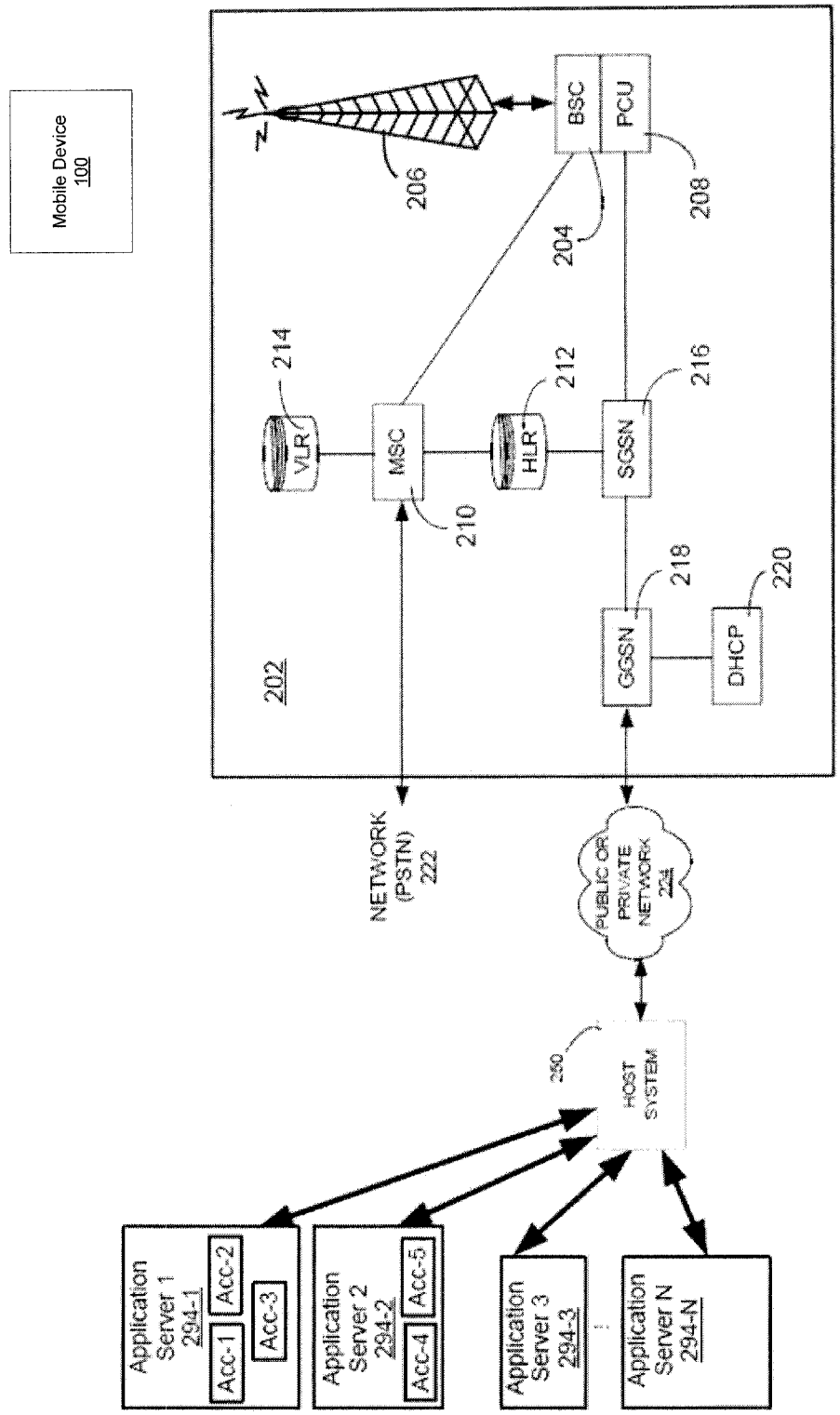
FIG. 3 is an example block diagram of a node of a wireless network.

In non-limiting implementations, mobile device 100 can include a feed application 192 and a viewer 194. With reference to FIG. 3, feed application 192 receives data from any suitable number of servers 294-1, 294-2, 294-3 . . . 294-N (collectively referred as application servers 294, and individual server as server 294), which can comprise various feed sources such as RSS; social networking (e.g., Twitter™, Facebook™), instant messaging (e.g., Google™ Chat, Yahoo Messenger™), enterprise applications (Lotus Connections), media subscriptions (e.g., podcasts, YouTube™), or the like. Data received from the servers 294, via host system 250 described below, is provided in the feed application 192, for example in a viewer 194 (see FIG. 8) at display 110. (Servers in this application relates to suitable servers capable of hosting entities that act as feed sources. Servers can comprise one computer or a network of more than one computer.) Each server 294 can be associated with one or more accounts ACC. As depicted in FIG. 3, server 294-1 is associated with accounts ACC-1, ACC-2, ACC-3, server 294-2 is associated with accounts ACC-4, ACC-5, and servers 294-3, 294-N are not associated with any account. Indeed, it will be appreciated that servers 294-1, 294-2 are each enabled to provide services for which multiple accounts for mobile device 100 have been created, specifically services that provide data to mobile device 100 for feed application 192, such as social networking data, RSS data, feed data, or the like. Furthermore, data can be posted to accounts ACC-1, ACC-2, ACC-3, ACC-4, ACC-5 for access by other devices subscribed to respective data from accounts ACC. It will be further appreciated that servers 294-3, 294-N are servers for which no accounts have yet been created; however accounts could be created at a later time. Associated accounts ACC-1, ACC-2, ACC-3, ACC-4, ACC-5 of servers 294 are registered at mobile device 100 (e.g. registration data is stored in a data file associated with feed application 192), and when feed application 192 is running, feed application 192 logs into the associated accounts ACC-1, ACC-2, ACC-3, ACC-4, ACC-5 in an always-connected mode. Hence, posts, news, feeds or the like from each account at each server 294 appear in the viewer 194 connected to the feeds application 192.

The viewer 194 connects to the feed application 192 to display the content retrieved by the feed application 192 (more details will be provided below).

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 104 and input to the main processor 102. The main processor 102 processes the received signal for output to the display 110 or alternatively to the auxiliary I/O subsystem. A subscriber may also compose data items, such as e-mail messages, for example, using the keyboard 116 in conjunction with the display 110 and possibly the auxiliary I/O subsystem 112. The auxiliary subsystem 112 may include any suitable input device such as: a touch screen, mouse, track ball, infrared fingerprint detector, a touchpad, a touch screen or a roller wheel with dynamic button pressing capability. The keyboard 116 may be an alphanumeric keyboard and/or telephone-type keypad. However, other types of keyboards may also be used, such as a virtual keyboard implemented by rendering key images on a touch screen display. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
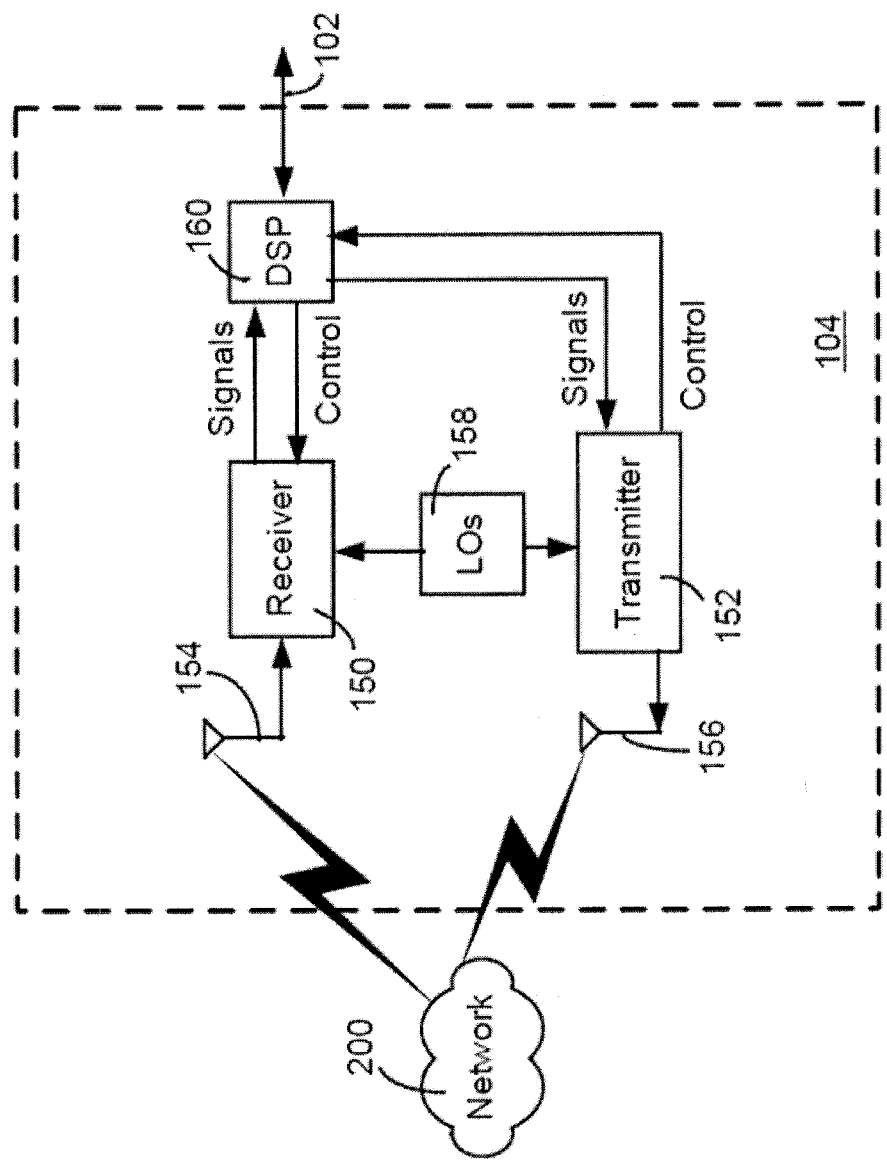
FIG. 2 is a block diagram of an example implementation of a communication subsystem component of the mobile device of FIG. 1.

Referring now to FIG. 2, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Referring now to FIG. 3, a block diagram of an example implementation of a node 202 of the wireless network 200 is shown. In practice, the wireless network 200 comprises one or more nodes 202. In conjunction with the connect module 144, the mobile device 100 can communicate with the node 202 within the wireless network 200. In the example implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

The host system 250 is in communication with the servers 294 via any suitable combination of communication links and communication networks, which can be at least one of wired or wireless. As described above, the mobile device 100 can be signed into accounts ACC-1, ACC-2, ACC-3, ACC-4, ACC-5 at the servers 294, and the servers 294 can send data associated with the respective accounts to the mobile device 100 for storage and display thereon, for example via the feed application 192.

Figure 4:
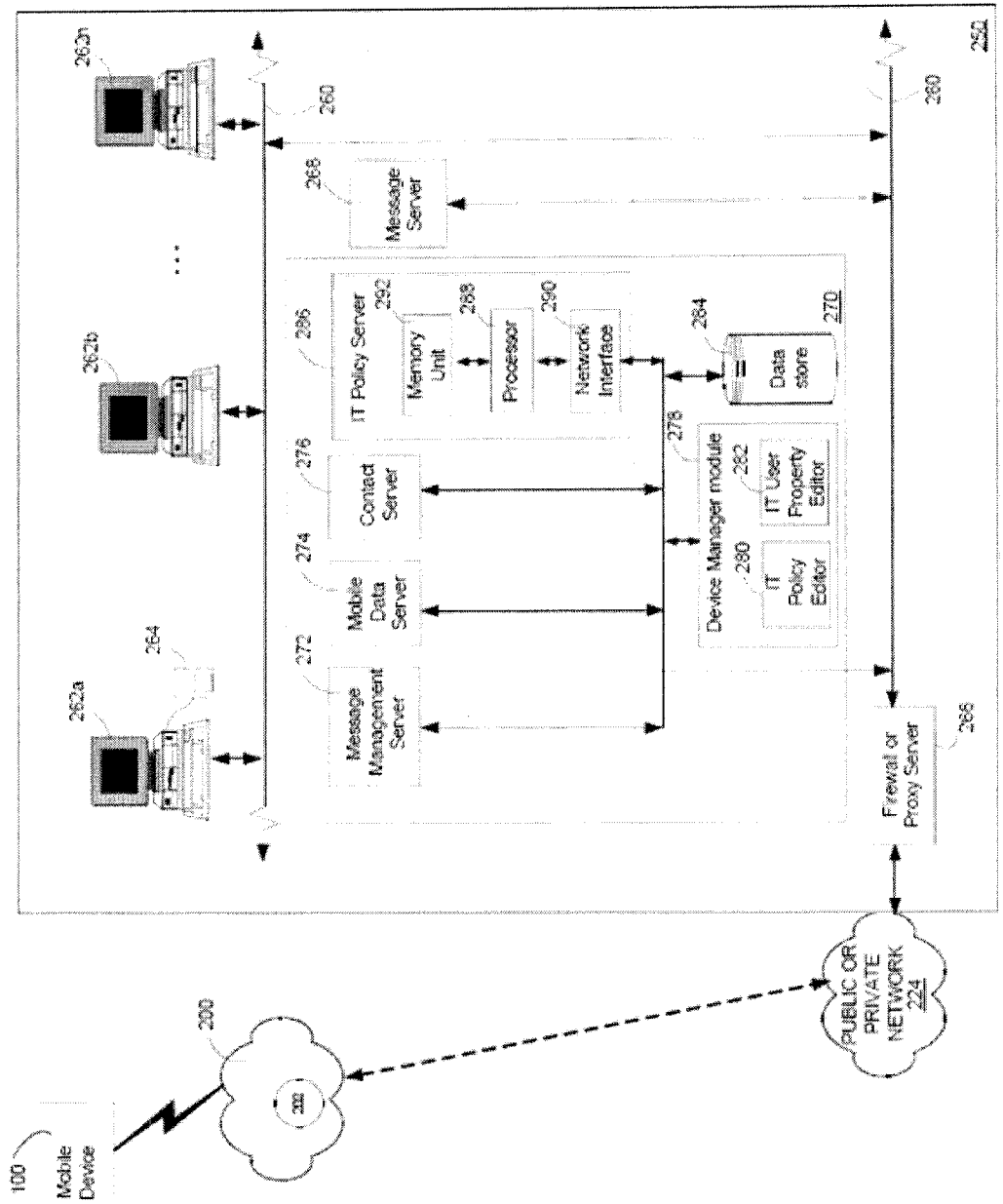
FIG. 4 is a block diagram illustrating components of a host system in one example configuration for use with the wireless network of FIG. 3 and the mobile device of FIG. 1, the host system in communication with servers.

Referring now to FIG. 4, shown therein is a block diagram illustrating components of an example configuration of a host system 250 that the mobile device 100 can communicate with in conjunction with the connect module 144. While not depicted in FIG. 4, it is appreciated that host system 250 is also in communication with servers 294. The host system 250 will typically be a corporate enterprise or other local area network (LAN), but may also be a home office computer or some other private system, for example, in variant implementations. In this example shown in FIG. 4, the host system 250 is depicted as a LAN of an organization to which the mobile device 100 is associated. Typically, a plurality of mobile devices can communicate wirelessly with the host system 250 through one or more nodes 202 of the wireless network 200.

The host system 250 comprises a number of network components connected to each other by a network 260. For instance, a desktop computer 262a with an accompanying cradle 264 for the mobile device 100 is situated on a LAN connection. The cradle 264 for the mobile device 100 can be coupled to the computer 262a by a serial or a Universal Serial Bus (USB) connection, for example. Other computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this example configuration. More generally, the host system 250 may represent a smaller part of a larger network (not shown) of the organization, and may comprise different components and/or be arranged in different topologies than that shown in the example implementation of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative implementation, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example implementation, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless Internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some implementations, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile devices need to be supported.

Alternatively, in some implementations, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis as explained further below and in conjunction with FIGS. 5 to 8. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

It is to be emphasized that the foregoing provides non-limiting examples of configurations for mobile device 100, host system 250. For example, it is to be understood that mobile device 100 is purely example, and it will be apparent to those skilled in the art that a variety of different portable electronic device structures are contemplated. Indeed variations on mobile device 100 can include, without limitation, a cellular telephone, a portable email paging device, a camera, a portable music player, a portable video player, a portable video game player. Other contemplated variations include devices which are not necessarily portable, such as desktop computers.

Figure 5:
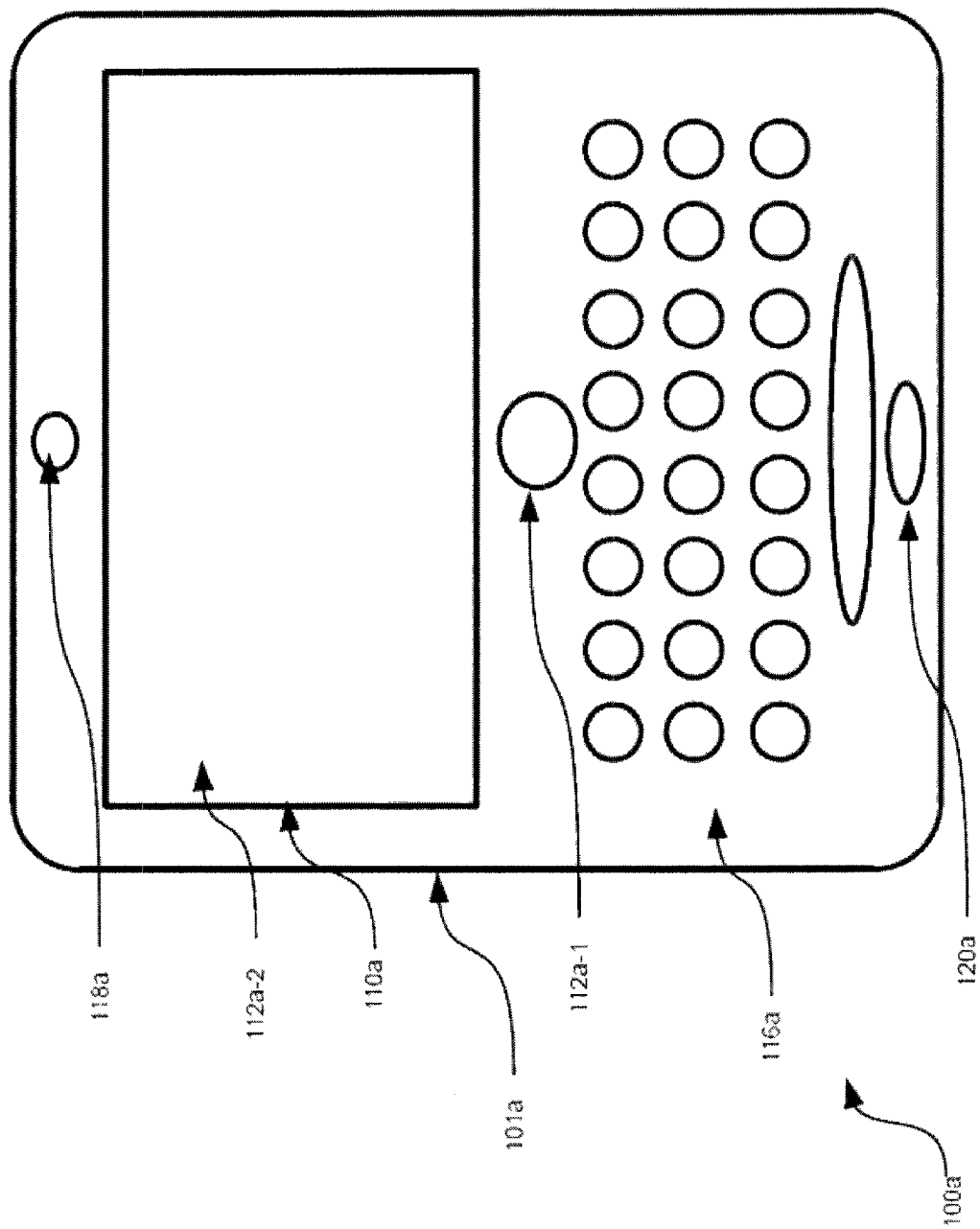
FIG. 5 is a schematic representation of an appearance of a mobile device according to FIG. 1.

Referring now to FIG. 5, a specific contemplated variation of device 100 is indicated at 100a. Mobile device 100a contains several of the same components as device 100, or variations on them, and accordingly, like components bear like references, except followed by the suffix "a". However, while FIG. 1 showed a block diagram of the internal components of device 100, FIG. 5 shows an example physical appearance and structure for device 100a. Of note is that FIG. 5 shows the mobile device 100a as comprising a chassis 101a that supports display 110a. Display 110a can comprise one or more light emitters such as an array of light emitting diodes (LED), liquid crystals, plasma cells, or organic light emitting diodes (OLED). Other types of light emitters are contemplated. Chassis 101a also supports keyboard 116a. It is to be understood that this specification is not limited to any particular structure, spacing, pitch or shape of keyboard 116a, and the depiction in FIG. 5 is purely example. For example, full or reduced "QWERTY" keyboards are contemplated. Other types of keyboards are contemplated, such as a virtual keyboard implemented by rendering key images on a touch screen display. Device 100a also comprises a first pointing device 112a-1 which in a present implementation is implemented as a touch-pad, but in other implementations can be implemented as a joystick, trackball, track-wheel. Device 100a also comprises a second pointing device 112a-2 which in a present implementation is implemented as a touch-sensitive membrane disposed over display 110a, thereby providing a touch-screen for device 100a. While two pointing devices 112a-1 and 112a-2 are provided in this example, it is to be understood that in variations, only one pointing device 112a-1 and 112a-2 may be provided. It should also be understood that other types of input devices are contemplated, including input devices which are structurally different than the specific examples provided, but are also functionally equivalent and able to, for example, receive "swipe" inputs and send an electrical signal representing such an input to processor 102b. Device 100a also comprises a speaker 118a for generating audio output, and a microphone 120a for receiving audio input.

Figure 6:
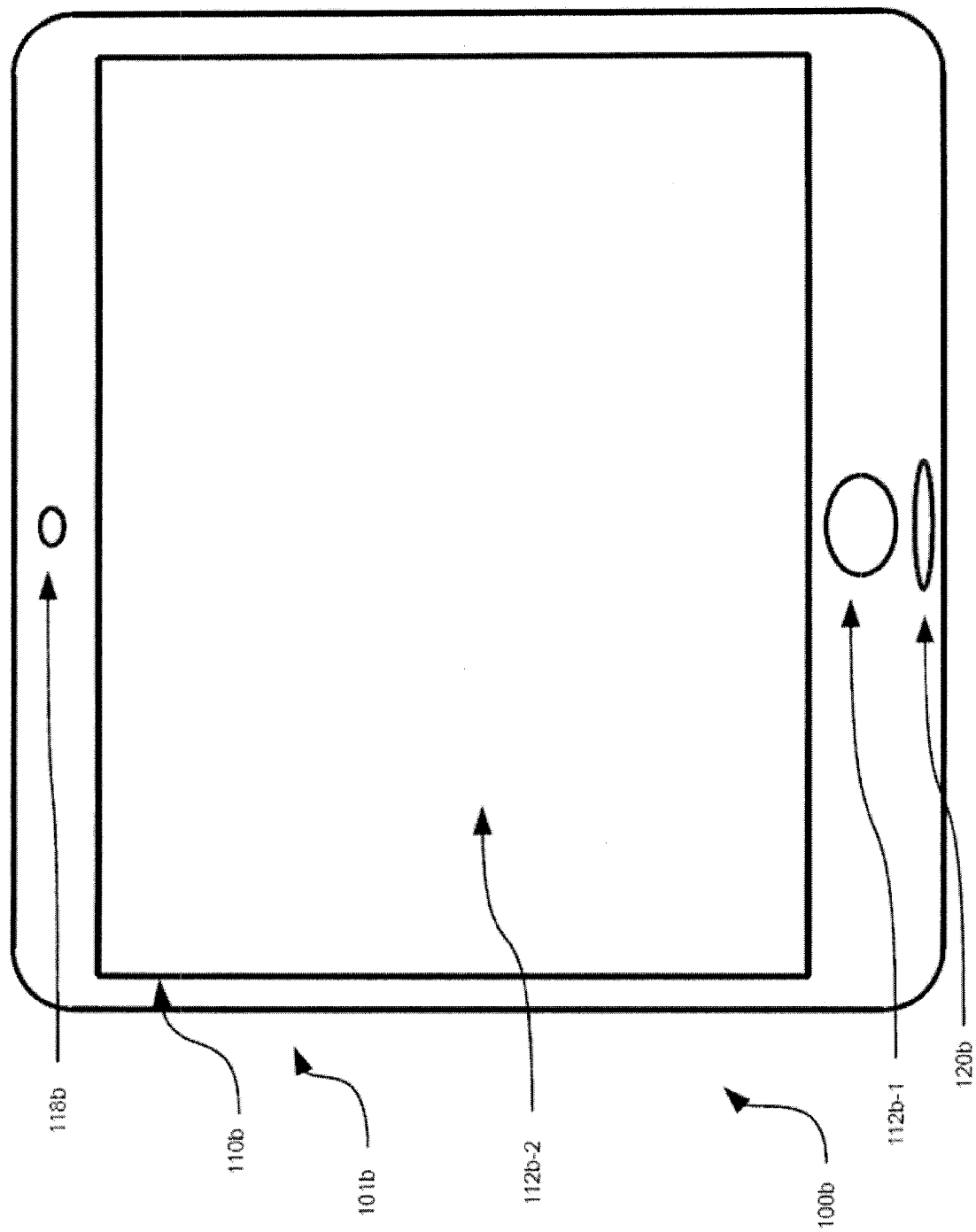
FIG. 6 is a schematic representation of an appearance of another mobile device.

Referring now to FIG. 6, another specific contemplated variation of device 100 is indicated at 100b. Mobile device 100b contains several of the same components as device 100a, or variations on them, and accordingly, like components bear like references, except followed by the suffix "b". Of note is that in FIG. 6, keyboard 116a is not provided, while two pointing devices 112b-1 and 112b-2 are provided. Again, in a variation of device 100b, only one of pointing devices 112a-1 and 112a-2 may be provided, although in such a variation, typically second pointing device 112b-2 is provided in order to provide a touch-screen for device 100b.

Figure 7:
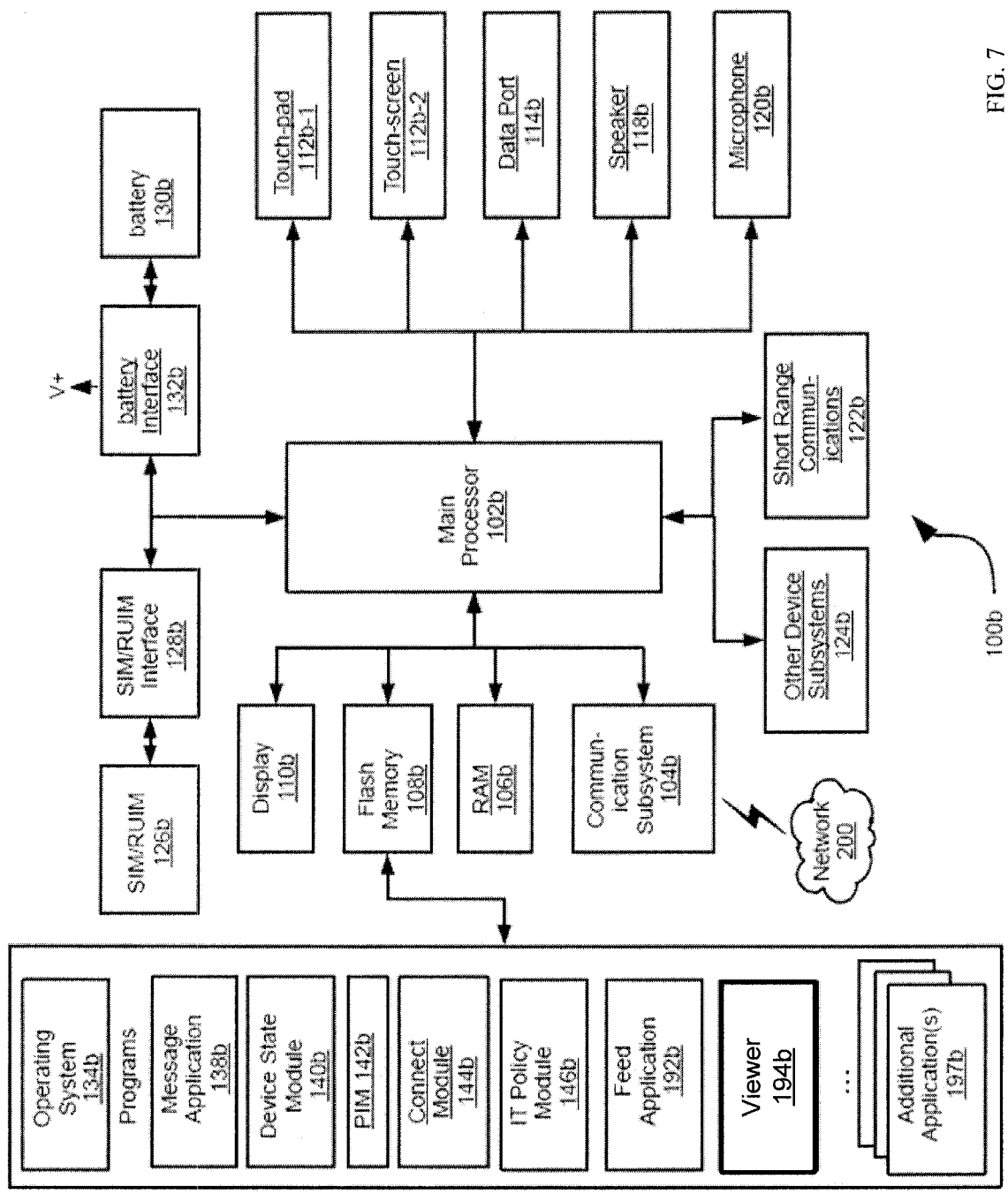
FIG. 7 is a block diagram of the mobile device of FIG. 6.

For convenience, the following discussion is made with reference to mobile device 100b, including both pointing devices 112b-1 and 112b-2, but upon reading the remainder of this specification, those skilled in the art will become able to appreciate how the following discussions can be applied to variations of mobile device 100b. To that end, FIG. 7 shows a block diagram of device 100b. FIG. 7 is a modified version of FIG. 1, and of note FIG. 7 specifically labels touch-pad 112b-1 and touch-screen 112b-2. Also of note is that, in a present non-limiting example implementation, touch-pad 112b-1 is configured to not only be sensitive to touch inputs, but touch-pad 112b-1 is also mechanically structured as a mechanical switch, such that it can also be mechanically depressed and moved in a direction that is normal to the surface of touch-pad 112b-1. The mechanical switch is also spring biased towards a non-depressed position, so that upon release the mechanical switch returns to the non-depressed position. Accordingly, touch-pad 112b-1 is configured to receive selection inputs by mechanical depression of touch-pad 112b-1, while touch-screen 112b-2 is configured to receive selection inputs corresponding to screen focus by a tap received on touch-screen 112b-2. It should be noted, however, that in variations, touch-pad 112b-1 can additionally be configured, or alternatively configured, to receive selection inputs by a tap received on touch-pad 112b-1. Where touch-pad 112b-1 can received a tap input, then the mechanical switch can be removed from touch-pad 112b-1 altogether.

While not shown, in another variation it should be understood that touch-screen 112b-2 can also be varied to also include a mechanical switch so that a force requiring a mechanical click on touch-screen 112b-2 in order to select an item in focus on touch screen 112b-2. Such a mechanical switch can be provided for touch-screen 112b-2 either in lieu of, or in addition to, the "tap" input capability provided for touch-screen 112b-2.

FIG. 7 also specifically labels, as part of device 100b, at least one additional application 197b.

Figure 8:
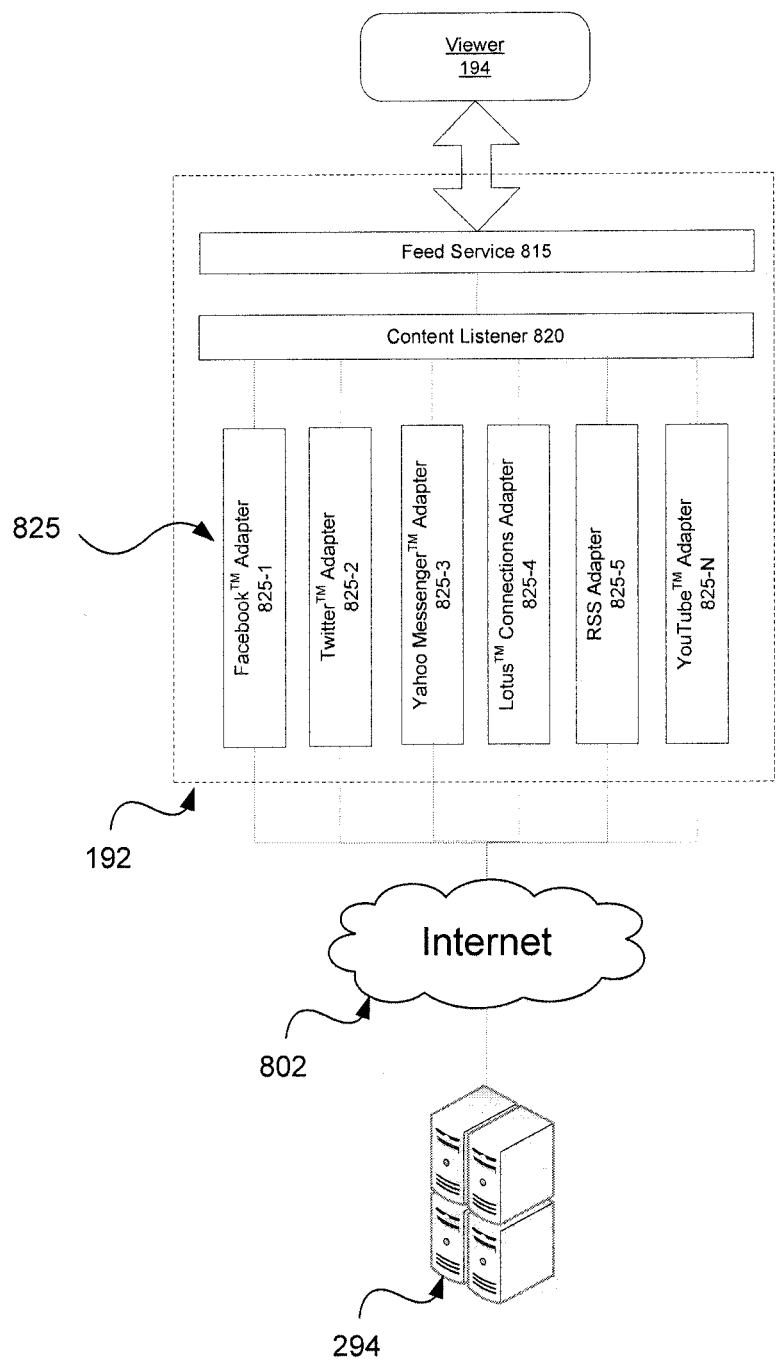
FIG. 8 is a block diagram of the feed application and its interconnection with the servers and the viewer.

Referring now to FIG. 8, a pluggable architecture is illustrated for the feed application 192 according to the exemplary embodiment. The feed application 192 is shown connected to the servers 294 via the Internet 802. (FIG. 8 provides a simplified view of the connections between the feed application 192 and the servers 294 in order to explain the inner workings of the feed application 192. The Internet 802 can be, for example, implemented as part of network 200 or other data networks discussed above.) The viewer 194 can connect to the feed application 192 to display feed contents retrieved by the feed application 192. The connection can be based on any known method of inter-application connections (e.g., sockets, shared memory, etc. . . . ). The viewer 194 provides functionality that is independent (decoupled) from the interface (protocol, transport and APIs) used to communicate with the servers 294, and generates navigable user screens for browsing the content of the feed sources on the device 100.

The structure of the feed application 192 is divided into three layers: a feed service 815, a content listener 820, and multiple feed adapters 825-1, 825-2, 825-3 . . . 825-N (collectively referred as feed adapters 825, and individual feed adapter as feed adapter 825). (In some embodiments, the feed service 815 and the content listener 820 can be merged into one layer.) The feed adapters 825 are self-registering processes (more detail will be provided below) that use respective source-specific transport mechanisms to retrieve content from the servers 294. In the illustrated embodiment, exemplary plug-in feed adapters 825 are shown such as a Facebook™ adapter 825-1, a Twitter™ adapter 825-2, a Yahoo Messenger™ adapter 825-3, a Lotus™ Connections adapter 825-4, a RSS adapter 825-5, and a YouTube™ adapter 825-N. Additional adapter classes can be added to the mobile device 100 without recompilation/re-deployment of the feed application 192 by adding an installation file (e.g. a .cod file) that registers itself with the device 100 as a feed adapter 825 so that it can be detected when running the feed application 192.

The feed service 815 manages the feed adapters 825, the content listener 820, and the connections with the viewer 194. The content listener 820 manages the delivery of the content from the feed adapters 825 to the viewer 194.

In operation, the feed application 192 typically runs in the background to retrieve content from the feed sources (i.e., servers 294). To display the content, the viewer 194 is activated and connected to the feed application 192 to retrieve the content that the feed application 192 has retrieved from the servers 294.

Figure 9:
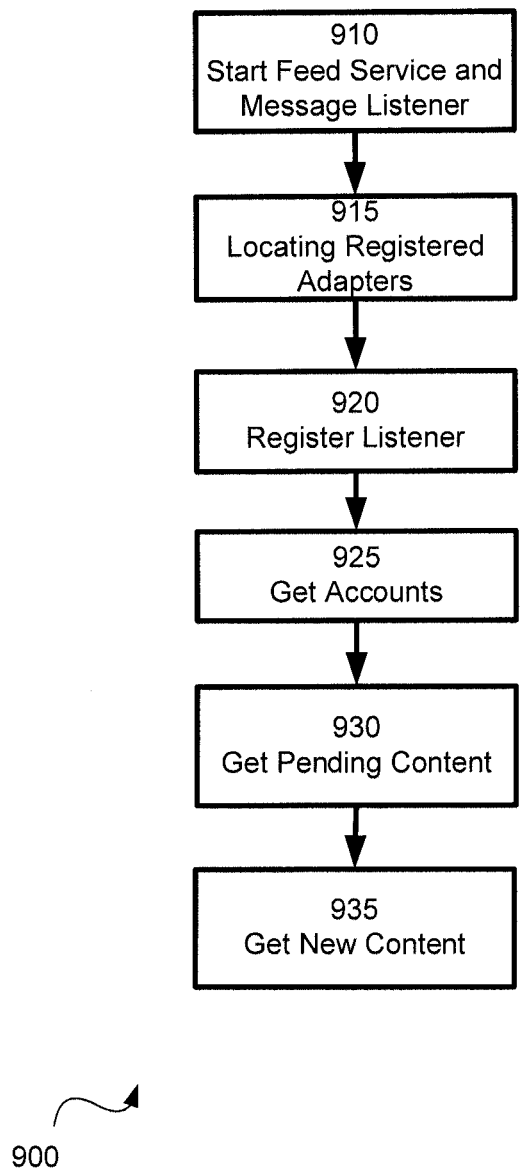
FIG. 9 shows a flowchart depicting a method of receiving data from a plurality of accounts.
Figure 10:
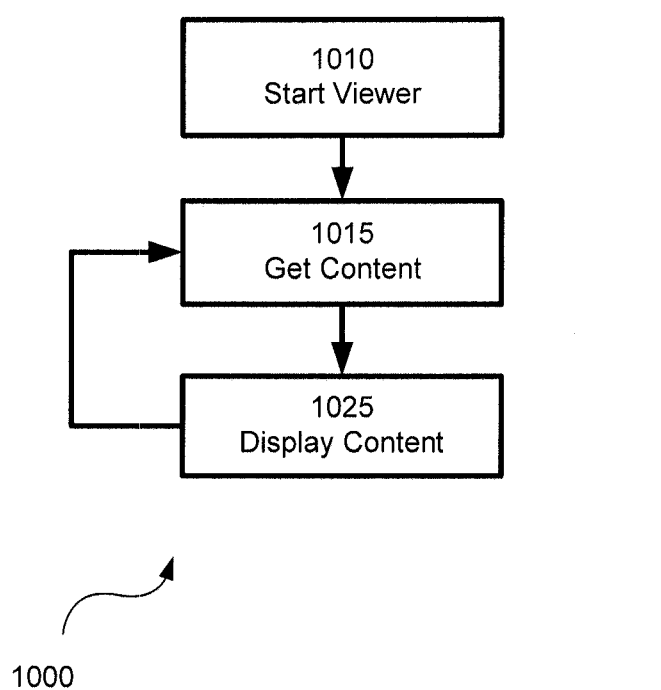
FIG. 10 shows a flowchart depicting a method of displaying data from a plurality of accounts.

FIGS. 9 and 10 depict methods 900 and 1000 of retrieving and viewing content, respectively, from the multiple servers 294. To assist in understanding the methods, each method will be explained in terms of its performance using the mobile device 100. However, it is to be understood that this discussion is not to be construed in a limiting sense, and that the method can be performed on devices other than the mobile device 100, and/or that the method can be varied.

Block 910 comprises starting the feed service 815 and the content listener 820.

Block 915 comprises locating all the feed adapters 825 that have been registered with the feed application 192.

(In the present embodiment, the feed service 815, content listener 820, and each of the feed adapters 825 start in their own respective thread.) Upon startup, the feed adapters 825 register with the feed application 192 and connect to their respective server 294. (Each feed adapter 825 can connect to one or more servers 294 depending on various factors such the number of accounts that the feed adapter 825 is associated with.) (In some embodiments, the feed adapters 825 register with the feed service 815.)

Block 920 comprises the content listener 820 registering a listener with each of the feed adapters 825. For example, the content listener 820 can retrieve all feed adapters 825 associated with the feed service 815 and loop through all the feed adapters 825 and register a listener with each feed adapter 825.

Block 925 comprises the feed service 815 retrieving all accounts ACC known to the feed adapter 825. For example, the content listener 820 can retrieve all feed adapters 825 associated with the feed service 815 and loop through all the feed adapters 825 and request all accounts ACC associated with each feed adapter 825.

As a result of block 920 and 925, device 100 becomes configured to instruct the feed adapter 825 to forward all new content, from the server 294, to the content listener 820. (New content is content that is created at the server 294 after the feed adapter 825 connects to the server 294.) (In some embodiments, a filter can be applied to limit what the feed adapters 825 retrieve from the servers 294 or to limit what the feed adapters 825 forward to the content listener 820.)

Block 930 comprises the content listener 820 retrieving, via the feed adapter 825, a pre-determined amount of pending content from the server 294. For example, the content listener 820 can retrieve all feed adapters 825 associated with the feed service 815 and loop through all the feed adapters 825 and request pending content from each feed adapter 825. (Pending content is content that is already in existence at the server 294 when the feed adapter 825 first connects to the server 294 and that may or may not have been viewed.) For example, for an RSS feed, the content listener 820 can instruct the feed adapter 825 to retrieve a pre-determined number of most recent pending messages from the server 294. After retrieving the pending messages from the server 294, the feed adapter 825 forwards the messages to the content listener 820. The content listener 820 notifies the feed service 815 that messages are available. If the viewer 194 is connected to the feed service 815, blocks 1015 and 1025 from method 1000 are executed (more details will be provided below).

Block 935 comprises the feed adapter 825 receiving new content from the server 294. The feed adapter 825 forwards the new content to the content listener 820. (The feed adapter 825 knows that the content listener 820 wishes to receive the new content because of block 920, described above.) Block 935 is repeatedly executed as the feed adapters 825 receive new content.

FIG. 10 depicts a method of viewing the content retrieved by the feed application 192 and indicated generally at 1000. According to the present example, method 1000 can be performed by viewer 194. Block 1010 comprises the viewer 194 starting and connecting to the feed application 192 via the feed service 815. In some embodiments, if the viewer 194 is started before the feed application 192 is started, the starting of the viewer 194 triggers the starting of the feed application 192.

Block 1015 comprises the viewer 194 retrieving the content from feed application 192. The feed service 815 retrieves content from content listener 820 and forwards the content to the viewer 194.

Figure 11:
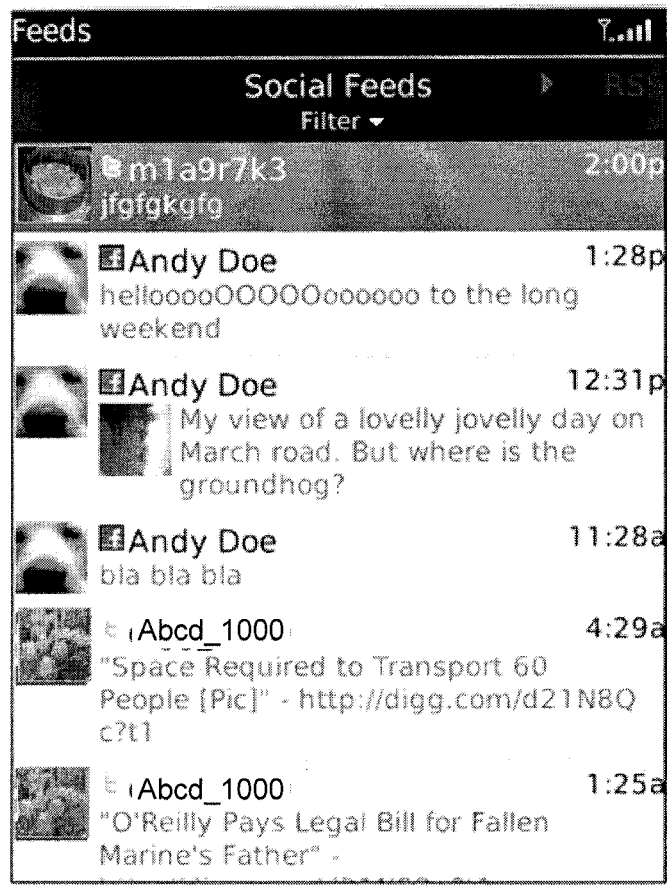
FIG. 11 is an example of a screen generated on the display of the mobile device of FIG. 1.

Block 1025 comprises the viewer 194 displaying the content on display 110. Blocks 1015 and 1025 are repeatedly executed as the feed adapters 825 receive new content. In the present embodiment, the content is displayed in a list view as shown by FIG. 11.

Figure 12:
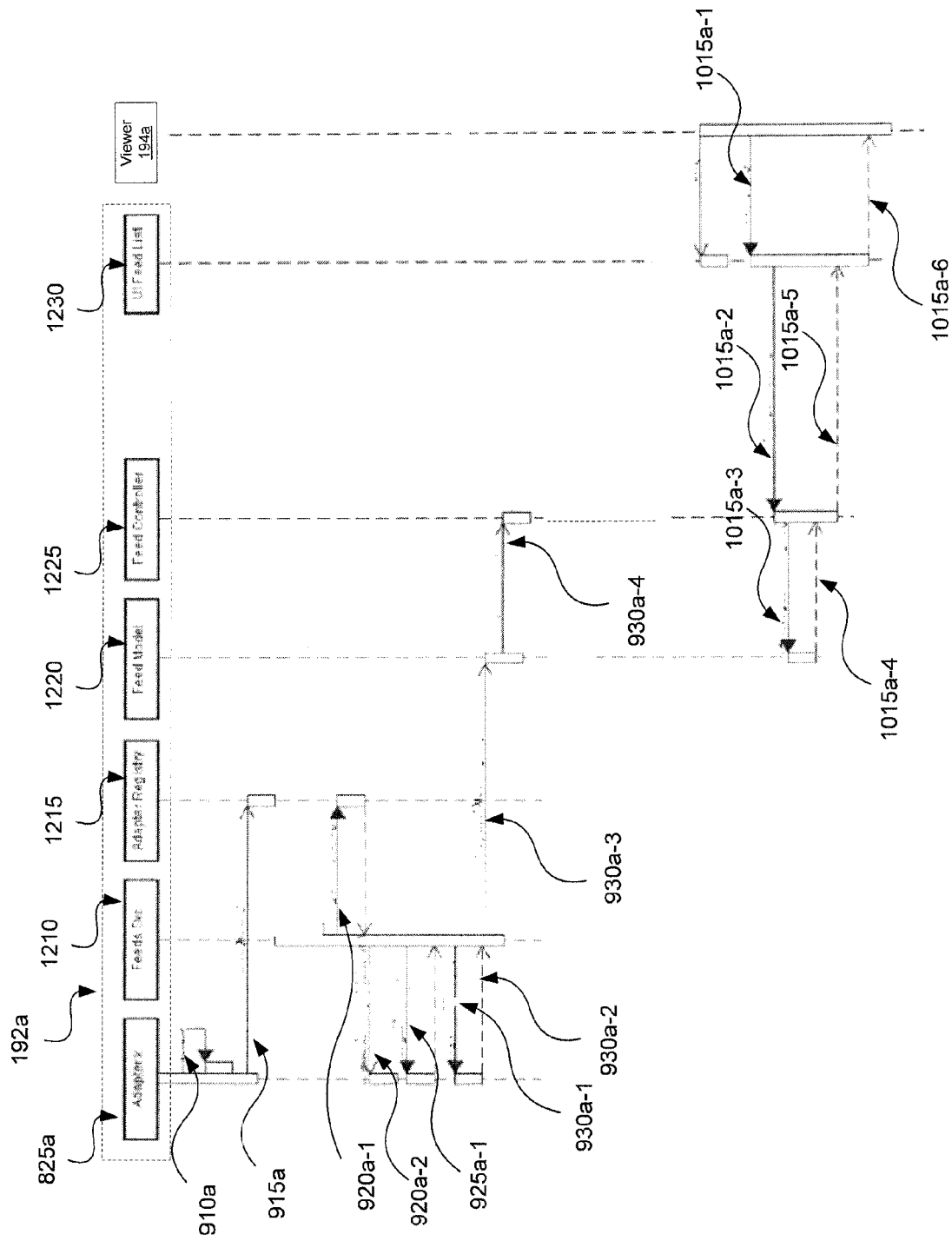

Referring to FIG. 12, a specific contemplated variation of feed application 192 is indicated at 192a. The feed application 192a contains several of the same components as the feed application 192, or variations on them, and accordingly, like components bear like references, except followed by the suffix "a". The same comments also apply to viewers 194 and 194a. Various blocks of methods 900 and 1000 are also depicted by FIG. 12 as flow arrows (with a suffix "a"). Where applicable, a flow arrow may be referenced by a sub element number. For example, the flow arrow that corresponds with block 930 comprises flow arrows 930a-1, 930a-2, 930a-3, and 930a-4. The feed application 192a comprises: a feeds svc 1210 (i.e., in this embodiment, the feed service 815 and the content listener 820 are merged into one layer), an adapter registry 1215, a feed model 1220, a feed controller 1225, and an UI feed list 1230. The adapter registry 1215 acts as a register for the feed adapters 825a. The feed model 1220 interfaces between the feed controller 1225 and the Feed svc 1210 with respect to the availability of content from the feed adapters 825a. The feed controller 1225 and the UI Feed List 1230 abstract the retrieval of messages from feed adapters 825a via the feed model 1220.

Continuing with FIG. 12, to register listeners, the feeds svc 1210, at 920a-1, retrieves all feed adapters from the adapter registry 1215. At 920a-2, the feeds svc 1210 registers a listener with each of the feed adapters 825a that were retrieved from the adapter registry 1215.

To retrieve pending content from the feed sources, the feeds svc 1210, at 930a-1, requests pending content from the feed adapters 825a. The feed adapter 825a sends the pending content to the feed model 1220 via the feed svc 1210, at 930a-2 and 930a-3. At 930a-4, the feed model notifies the feed controller 1225 that pending content is available.

To retrieve content from feed application 192a, the viewer 194a issues a retrieve command to the UI feed list 1230, at 1015a-1. The UI feed list 1230 notifies the feed model 1220 via the feed controller 1225, at 1015a-2 and 1015a-3. The feed model 1220 sends the content to the viewer 194a via the feed controller 1225 and the UI feed list 1230, at 1015a-4, 1015a-5, and 1015a-6.

Figure 13:
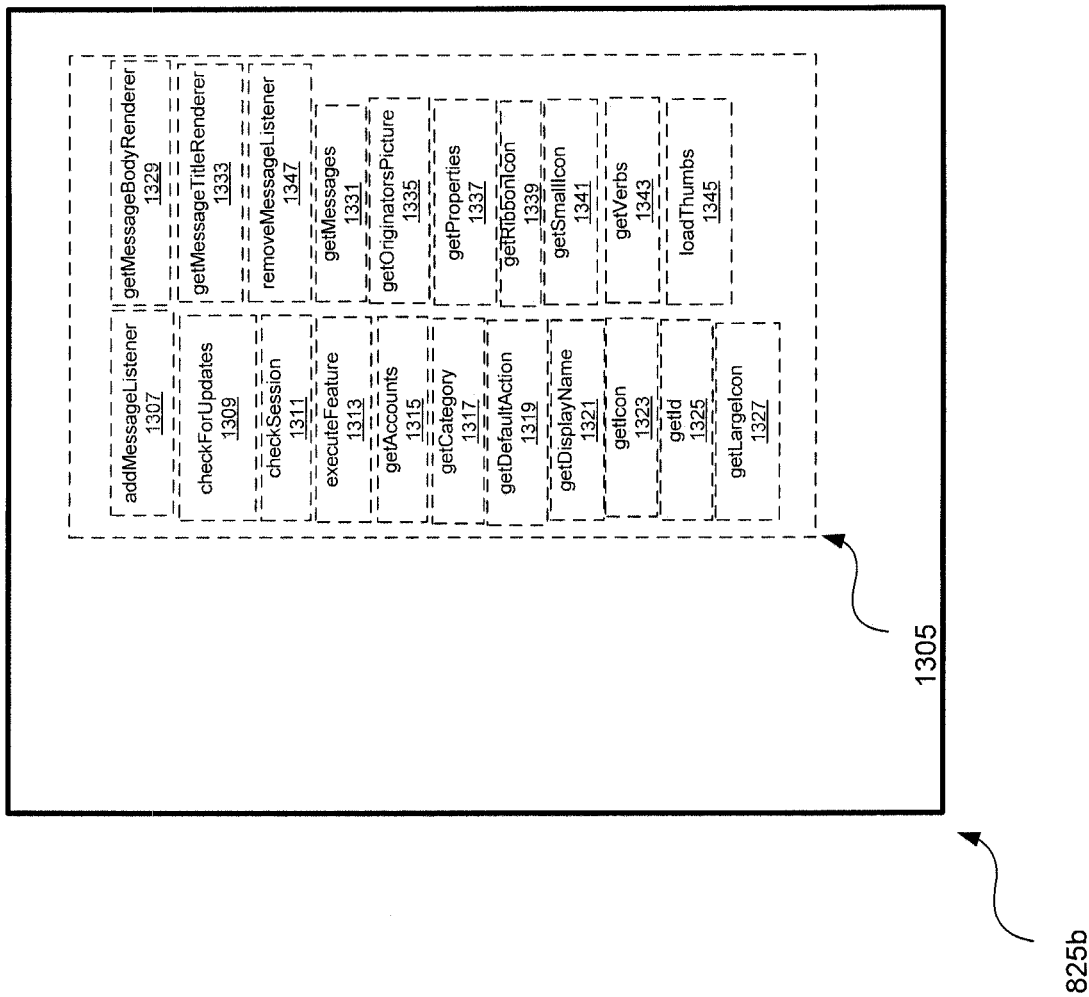

Referring to FIG. 13, an exemplary non-limiting embodiment of the feed adapters 825, 825a is generally indicated as 825b. The feed adapter 825b comprises an interface 1305 which comprises the following functions that can be performed by the feed adapter 825b:

an addMessageListener function 1307 which adds a listener to the feed adapter 825b;

a checkForUpdates function 1309 which provides a "hint" to the feed adapter 825b that it should check for updates;

a checkSession function 1311 which checks the status of a session for a given account;

an executeFeature function 1313 which executes a specified feature;

a getAccounts function 1315 which gets all the known accounts for the feed adapter 825b, regardless of whether the accounts are currently logged-in;

a getCategory function 1317 which retrieves the category of the feed adapter 825b;

a getDefaultAction function 1319 which retrieves the default verb to be executed;

a getDisplayName function 1321 which retrieves the display name of the social network;

a getIcon function 1323 which retrieves the icon to display against the feed source;

a getId function 1325 which retrieves the unique identifier for the feed adapter 825b, that must be consistent across resets—typically a compile-time constant;

a getLargeIcon function 1327 which gets the large icon to display against messages from the feed source;

a getMessageBodyRenderer function 1329 which retrieves the custom renderer for the message body;

a getMessages function 1331 which retrieves pending messages;

a getMessageTitleRenderer function 1333 which retrieves the custom renderer for the title;

a getOriginatorsPicture function 1335 which retrieves the picture displayed against the feed item;

a getProperties function 1337 which retrieves the properties of the feed adapter 825b;

a getRibbonIcon function 1339 which retrieves the ribbon icon for the feed source;

a getSmallIcon function 1341 which retrieves the small icon to display against messages from the feed source;

a getVerbs function 1343 which retrieves the verbs relevant to a selected item from a menu;

a loadThumbs function 1345 which loads the thumbs for a PhotoFeedMessage or TextFeedMessage; and a removeMessageListener function 1347 which removes a listener from the feed adapter 825b.

By decoupling the content viewing functionality from the content retrieving functionality, several advantages are evident. New feed sources can be accessed without having to modify the feed application 192, 192a and the viewer 194, 194a. All that is required is to develop new feed adapters 825, 825a, 825b for the new feed sources. If a format for an existing feed source changes, only the feed adapter 825, 825a, 825b associated with that feed source needs to be updated instead of having to update the entire feed application 192, 192a. The methods 900 and 1000 can operate concurrently. For example, the processor 102 can be executing steps 930 and 935 concurrently with steps 1010, 1015, and 1025.

In the above embodiments, where content is retrieved by polling via the recipient requesting the content from the provider, the retrieval can be substituted by pushing via the provider pushing the message to the recipient and where content is retrieved by pushing via the provider pushing the message to the recipient, the retrieval can be substituted by polling via the recipient requesting the content from the provider.

Those skilled in the art will appreciate that in some implementations, the functionality of mobile devices 100, 100a, 100b can be implemented using pre-programmed hardware or firmware elements (e.g., application specific integrated circuits (ASICs), electrically erasable programmable read-only memories (EEPROMs), etc.), or other related components. In other implementations, the functionality of mobile devices 100, 100a, 100b can be achieved using a computing apparatus that has access to a code memory (not shown) which stores computer-readable program code for operation of the computing apparatus. The computer-readable program code could be stored on a non-transitory computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Those skilled in the art will now recognize certain advantages from this specification. A mobile device typically has a limited screen size, processing capacity, memory capacity, and battery power. These limited resources would be strained if a mobile device that needs to monitor a plurality of feed sources must accomplish the task by using a plurality of feed applications, each application specifically designed for each feed source. Because of the limited screen size, applications would have to be repeatedly minimized and maximized to share the display if the content of more than one feed source is to be displayed. Running multiple applications would deplete the battery power and consume processing resources. Storing a plurality of applications would consume memory capacity. This specification can obviate or at least mitigate at least some of these problems.

Persons skilled in the art will appreciate that there are yet more alternative implementations and modifications possible for implementing the implementations, and that the above implementations and examples are only illustrations of one or more implementations. Variations, subsets, enhancements and combinations of the foregoing are contemplated.

The invention claimed is:

1. A method of receiving data from a plurality of feed sources at a plurality of servers via a mobile device, the mobile device having a processor interconnected with a display, the method comprising:
   starting, via the processor of the mobile device, a feed service forming part of a feed application that is executed by the processor;
   registering, via the processor, feed adapters with the feed service, the feed adapters forming part of the feed application;
   receiving content data via the feed adapters; and
   controlling the display to generate a list view of the content data.

2. The method of claim 1 further comprising the feed adapters connecting to the servers.

3. The method of claim 1 further comprising registering, via the processor, listeners with the feed adapters.

4. The method of claim 3 further comprising starting, via the processor, a content listener, wherein the registering listeners comprises the content listener registering the listeners with the feed adapters.

5. The method of claim 1, wherein the receiving content data comprises receiving pending content.

6. The method of claim 1, wherein the receiving content data comprises receiving new content.

7. The method of claim 1, wherein the controlling the display to generate the list view of the content data comprises displaying the content data via a viewer.

8. The method of claim 7, wherein the controlling the display to generate the list view of the content data comprises starting the viewer.

9. The method of claim 8, wherein the controlling the display to generate the list view of the content data further comprises the viewer retrieving the content from the feed service.

10. The method of claim 9, wherein the controlling the display to generate the list view of the content data further comprises the viewer connecting to the feed service.

11. The method of claim 1, further comprising retrieving accounts for the feed adapters.

12. The method of claim 11, wherein the retrieving accounts comprises retrieving the feed adapters associated with the feed service and requesting all accounts associated with each the feed adapters.

13. The method of claim 1, wherein the receiving content data comprises retrieving a pre-determined amount of content from a server.

14. A mobile device for receiving data from a plurality of feed sources at a plurality of servers, the mobile device comprising:
   a display; and
   a processor configured to:
      start a feed service that forms part of a feed application that is executed by the processor;
      register feed adapters with the feed service, the feed adapters forming part of the feed application;
      receive content data via the feed adapters; and
      control the display to generate a list view of the content data.

15. The mobile device of claim 14, wherein the processor is further configured to connect the feed adapters to the servers.

16. The mobile device of claim 14, wherein the processor is further configured to register listeners with the feed adapters.

17. The mobile device of claim 16 wherein the processor is further configured to start a content listener, the registering the listeners comprises the content listener registering the listeners with the feed adapters.

18. The mobile device of claim 14, wherein the receive content data comprises receiving pending content.

19. The mobile device of claim 14, wherein the receive content data comprises receiving new content.

20. A computer program product, for a mobile device comprising a processor interconnected with a display, the computer program product comprising a non-transitory computer-readable storage medium having a computer-readable code adapted to be executed on the processor to implement a method of receiving data from a plurality of feed sources at a plurality of servers via the mobile device, the method comprising:
   starting, via the processor, a feed service forming part of a feed application that is executed by the processor;
   registering, via the processor, feed adapters with the feed service, the feed adapters forming part of the feed application;
   receiving content data via the feed adapters; and
   controlling the display to generate a list view of the content data.

* * * * *